United States Patent
Avganim

(10) Patent No.: US 9,358,895 B2
(45) Date of Patent: Jun. 7, 2016

(54) QUICK LOADING AND UNLOADING BATTERY SYSTEM FOR VEHICLES

(71) Applicant: Meir Avganim, Gealya (IL)

(72) Inventor: Meir Avganim, Gealya (IL)

( * ) Notice: Subject to any disclaimer, the term of this patent is extended or adjusted under 35 U.S.C. 154(b) by 0 days.

(21) Appl. No.: 14/524,499

(22) Filed: Oct. 27, 2014

(65) Prior Publication Data
US 2015/0114736 A1 Apr. 30, 2015

Related U.S. Application Data

(60) Provisional application No. 61/896,207, filed on Oct. 28, 2013.

(51) Int. Cl.
| | | |
|---|---|---|
| *B60S 5/06* | (2006.01) | |
| *B60L 11/18* | (2006.01) | |
| *B60K 1/04* | (2006.01) | |

(52) U.S. Cl.
CPC .............. *B60L 11/1822* (2013.01); *B60K 1/04* (2013.01); *B60S 5/06* (2013.01); *B60K 2001/0411* (2013.01); *B60K 2001/0416* (2013.01); *B60K 2001/0455* (2013.01); *B60K 2001/0477* (2013.01); *B60K 2001/0483* (2013.01); *Y02T 90/124* (2013.01)

(58) Field of Classification Search
CPC ................ B60K 2001/0477; B60K 2001/0483
USPC ....................................................... 180/68.5
See application file for complete search history.

(56) References Cited

U.S. PATENT DOCUMENTS

| | | | | |
|---|---|---|---|---|
| 3,690,397 | A | * 9/1972 | Parker ...................... | B60K 1/04 180/19.1 |
| 3,799,063 | A | * 3/1974 | Reed ........................ | B60K 1/04 104/34 |

(Continued)

FOREIGN PATENT DOCUMENTS

| | | |
|---|---|---|
| DE | 10 2006 032733 | 1/2008 |
| WO | WO 2012 035254 | 3/2012 |

OTHER PUBLICATIONS

International Search Report dated Apr. 29, 2015 issued in connection with corresponding PCT/IB20145/002929.

*Primary Examiner* — Jeffrey J Restifo
(74) *Attorney, Agent, or Firm* — Ostrolenk Faber LLP

(57) ABSTRACT

An electrical vehicle includes a vehicle body defining a passenger cabin; at least one battery compartment with an openable hood that can be opened to expose the battery compartment; a battery including electrical electrodes removably stored in the battery compartment; at least three battery supports mounted substantially in a vertical orientation in the battery compartment, wherein at least two of the battery supports include electrical contacts that are configured to be electrically coupled with the electrical electrodes of the battery; the battery includes at least two downwardly depending projections which are spatially spaced and arranged relative to each other so that their spacing identically matches a corresponding spacing between said at least three battery supports in the battery compartment, and at least two of the three battery projections comprise said electrical electrodes configured to electrically mate with the electrical contacts of the battery compartment; and the battery supports and the battery projections are so spaced and configured as to enable the battery to be vertically lowered onto the battery supports to effect electrical contact and mechanical coupling between the battery supports and the battery projections.

18 Claims, 17 Drawing Sheets

(56) References Cited

U.S. PATENT DOCUMENTS

| | | | | |
|---|---|---|---|---|
| 4,397,365 A * | 8/1983 | Harbe | B60K 1/04 104/34 |
| 5,163,537 A * | 11/1992 | Radev | B60K 1/04 180/65.1 |
| 5,301,765 A * | 4/1994 | Swanson | B60K 1/04 104/34 |
| 5,305,513 A * | 4/1994 | Lucid | B60K 1/04 104/34 |
| 5,452,983 A | 9/1995 | Parmley, Sr. | |
| 5,598,083 A * | 1/1997 | Gaskins | B60K 1/04 104/34 |
| 5,633,095 A | 5/1997 | Ishikawa et al. | |
| 5,664,932 A * | 9/1997 | Clonch | B60L 11/1822 180/68.5 |
| 5,760,569 A * | 6/1998 | Chase, Jr. | B60K 1/04 104/34 |
| 5,820,331 A * | 10/1998 | Odell | B60K 1/04 180/68.5 |
| 5,879,125 A * | 3/1999 | Odell | B60K 1/04 104/34 |
| 6,035,561 A | 3/2000 | Paytas et al. | |
| 6,113,342 A * | 9/2000 | Smith | B60L 11/1822 180/68.5 |
| 6,265,091 B1 | 7/2001 | Pierson et al. | |
| 6,631,775 B1 * | 10/2003 | Chaney | B60K 1/04 180/65.1 |
| 6,637,807 B2 * | 10/2003 | Gotz | B60K 1/04 180/65.1 |
| 7,128,179 B2 * | 10/2006 | Szymanski | B66F 9/0754 180/65.1 |
| 7,712,563 B2 * | 5/2010 | Niebuhr | B60K 1/04 180/311 |
| 7,828,099 B2 * | 11/2010 | Heckeroth | B60K 1/00 180/2.2 |
| 8,347,995 B2 * | 1/2013 | Fernandez-Mateo | B60K 1/04 180/65.22 |
| 8,852,794 B2 * | 10/2014 | Laitinen | H01M 2/1083 429/148 |
| 8,875,826 B2 * | 11/2014 | Franzen | B60L 11/18 180/65.1 |
| 2002/0003052 A1 | 1/2002 | Hayashi | |
| 2005/0274556 A1 * | 12/2005 | Chaney | B60K 1/04 180/68.5 |
| 2008/0006459 A1 * | 1/2008 | Niebuhr | B60K 1/04 180/68.5 |
| 2008/0268682 A1 | 10/2008 | Ting | |
| 2010/0136425 A1 | 6/2010 | Gau et al. | |
| 2010/0147604 A1 * | 6/2010 | Sakita | B60K 1/04 180/65.1 |
| 2010/0292877 A1 * | 11/2010 | Lee | B60K 1/04 701/21 |
| 2012/0306445 A1 | 12/2012 | Park et al. | |
| 2013/0285410 A1 * | 10/2013 | Auerbach | B60K 16/04 296/178 |
| 2015/0114736 A1 * | 4/2015 | Avganim | B60L 11/1822 180/68.5 |

* cited by examiner

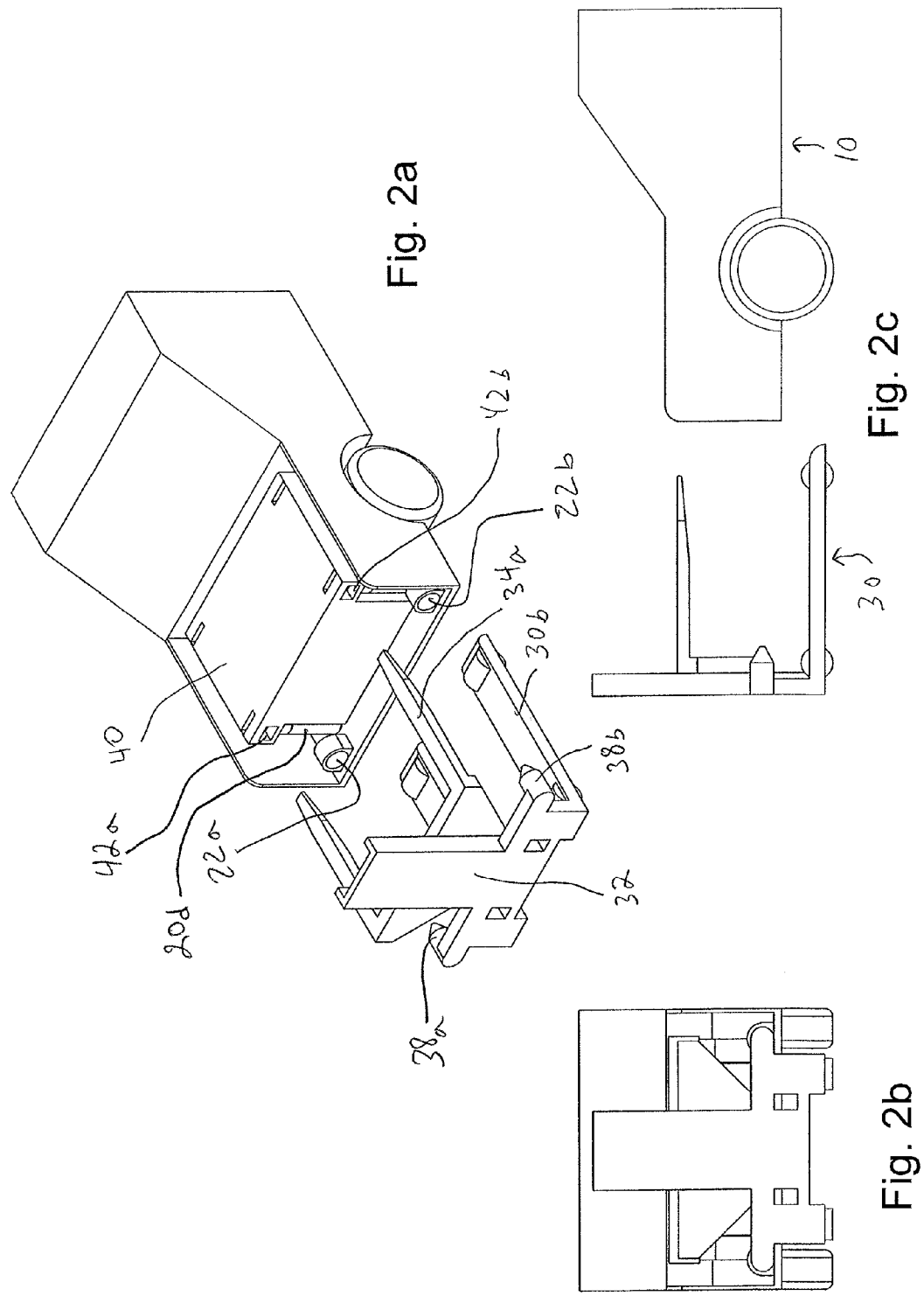

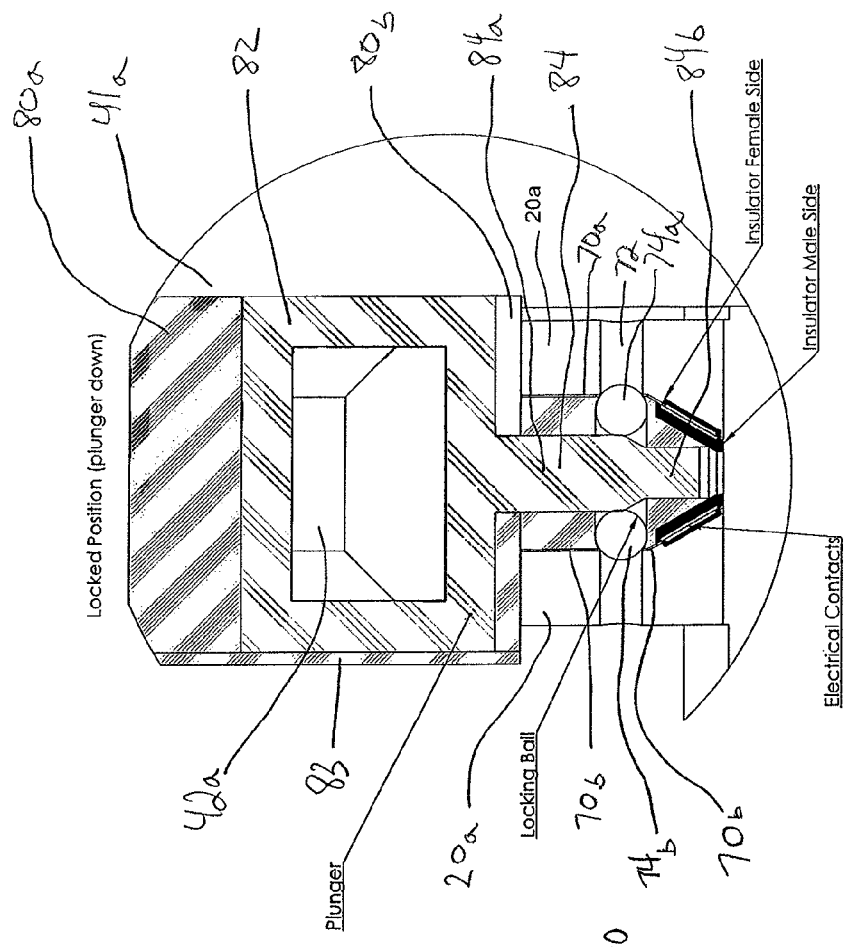
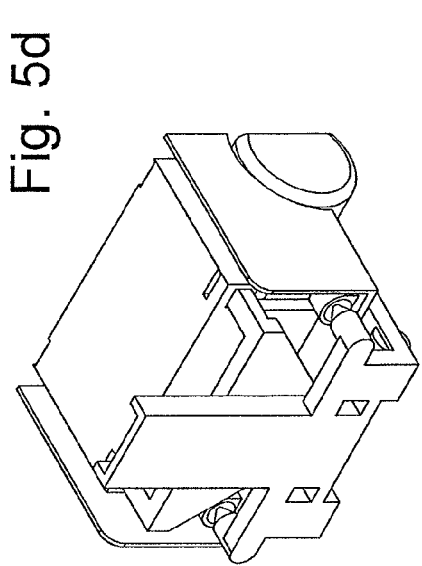
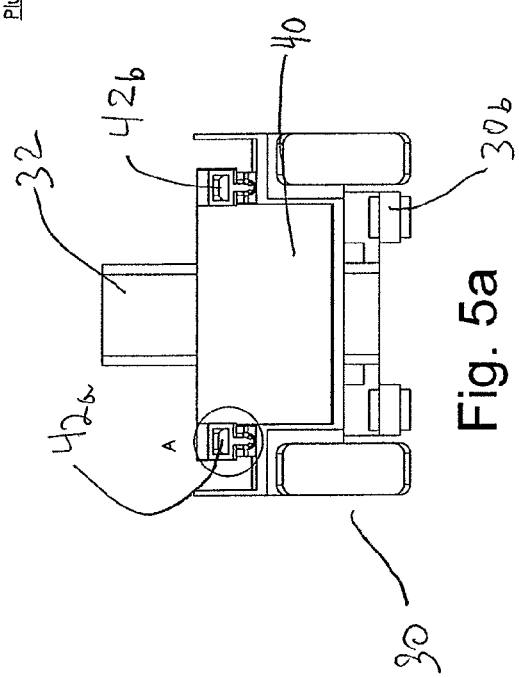

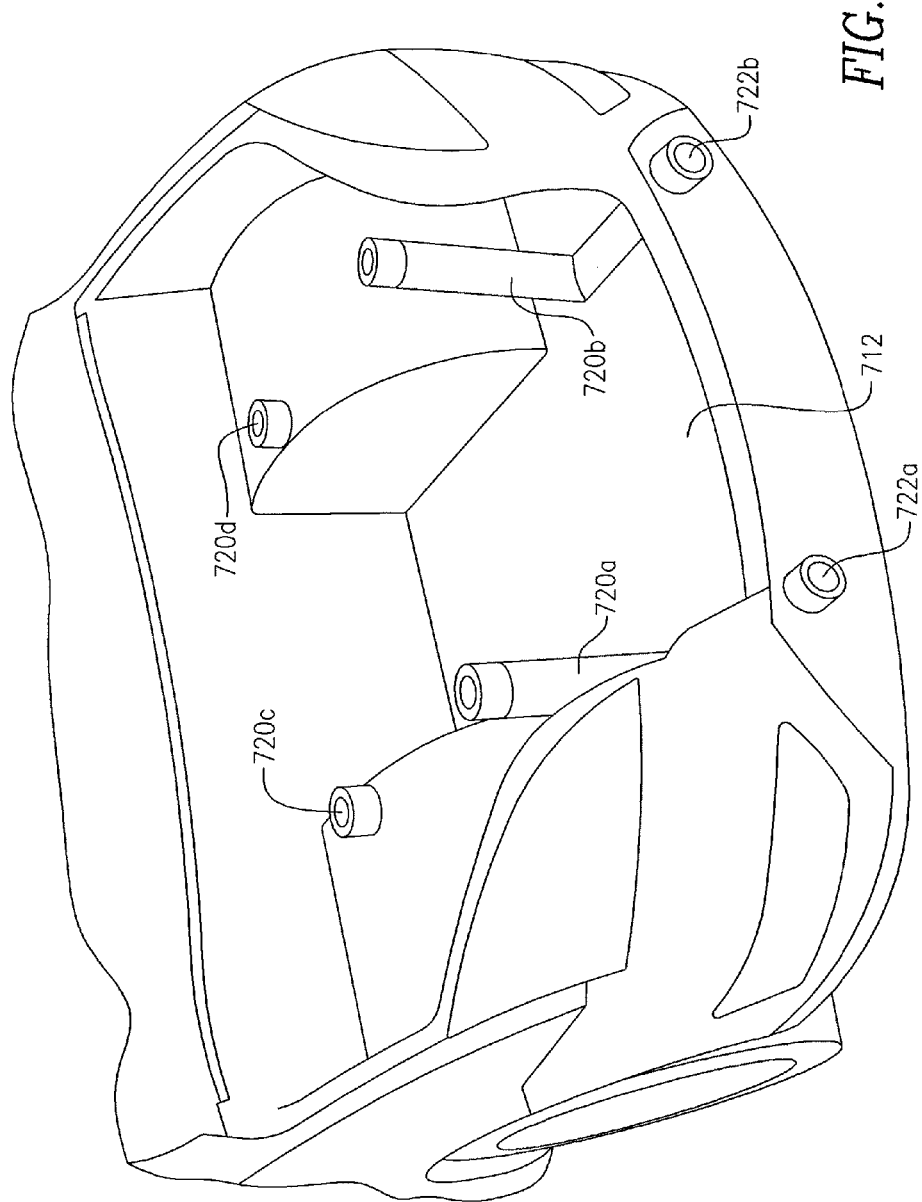

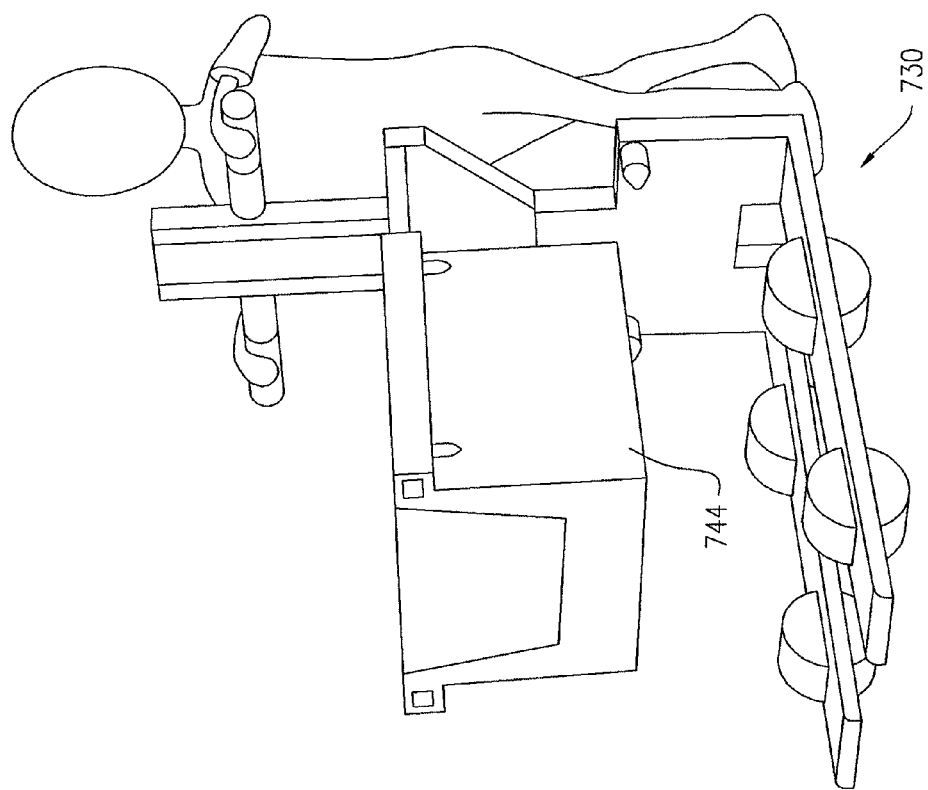

US 9,358,895 B2

QUICK LOADING AND UNLOADING BATTERY SYSTEM FOR VEHICLES

CROSS-REFERENCE TO RELATED APPLICATION

This application claims benefit of and prior to U.S. Provisional Application Ser. No. 61/896,207 filed Oct. 28, 2013, the contents of which are incorporated herein by reference.

BACKGROUND OF THE INVENTION

The present invention is directed to a quick and easy battery changing system for electrical vehicles.

Despite its great promise, electrical vehicles have not enjoyed great penetration of the market, owing to the difficulty, complexity, and large infrastructure cost required for setting up battery changing systems. Most systems to date involve the construction of pits over which a car must drive and very involved hydraulic systems which raise and lower the battery to mount it to or disconnect it from the bottom of a vehicle. The present invention aims to avoid, or at least ameliorate, the drawbacks of the prior art.

SUMMARY OF THE INVENTION

At its core, the invention comprises providing electrical batteries in standardized shapes, so that they can be used interchangeably among many different vehicles, and fit the same battery receiving structure in different vehicles, with the only change being that the electrical capacity varies from battery unit to unit. The standardized batteries of the present invention do not require expensive infrastructures at gas stations and can be installed or removed and replaced at gas stations or even at home.

Other features and advantages of the present invention will become apparent from the following description of the invention which refers to the accompanying drawings.

BRIEF DESCRIPTION OF THE DRAWINGS

FIGS. 2a, 2b and 2c show further details of the battery loading and unloading to and from the vehicle.

FIGS. 5a, 5b, 5c and 5d show further details of the battery electrode holding mechanism.

FIGS. 7a through 7g diagrammatically illustrate the manner of battery exchanges in accordance with the present invention.

DETAILED DESCRIPTION OF EMBODIMENTS OF THE INVENTION

Figure 7A:
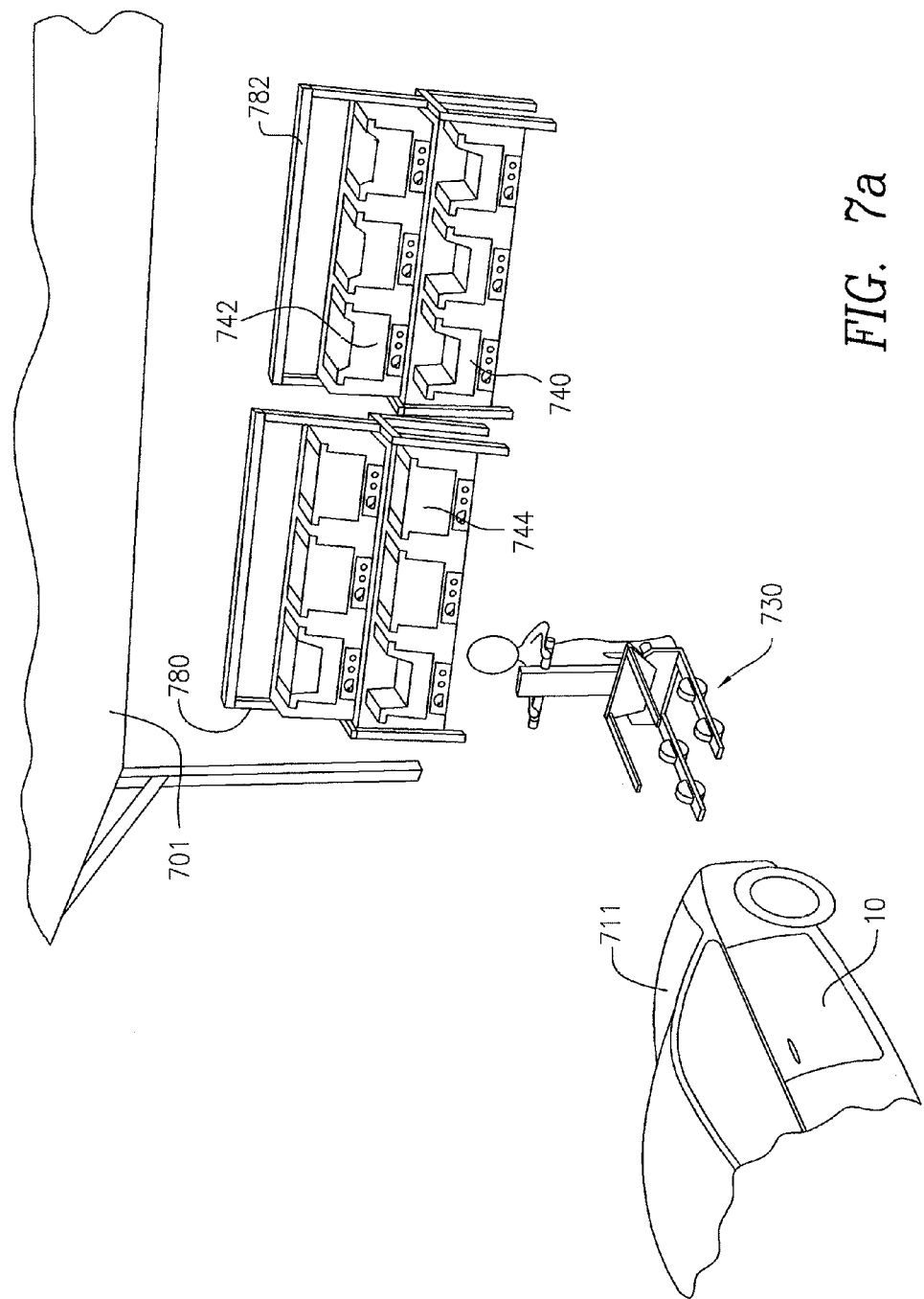

For quicker grasping of the concepts of the instant invention, initial reference is made to FIGS. 7a through 7g. FIG. 7a illustrates diagrammatically some area at a gas station where in an open space or under a shed 701, are located several charging bays 780, 782, each holding and charging at least two rows of batteries, including batteries of different sizes, for example, the smaller sized battery 740, the intermediate sized battery 742 and the full-sized battery 744.

Each of these batteries can be lifted off and away from the charging bays 780, 782, using a cart in the form of a forklift 730, whereby a discharged battery can be removed from the vehicle 10 by lifting its front hood 711, to be placed for charging in the charging bays and taking another fully charged battery from the charging bays and installing it in the vehicle 10.

Figure 7B:
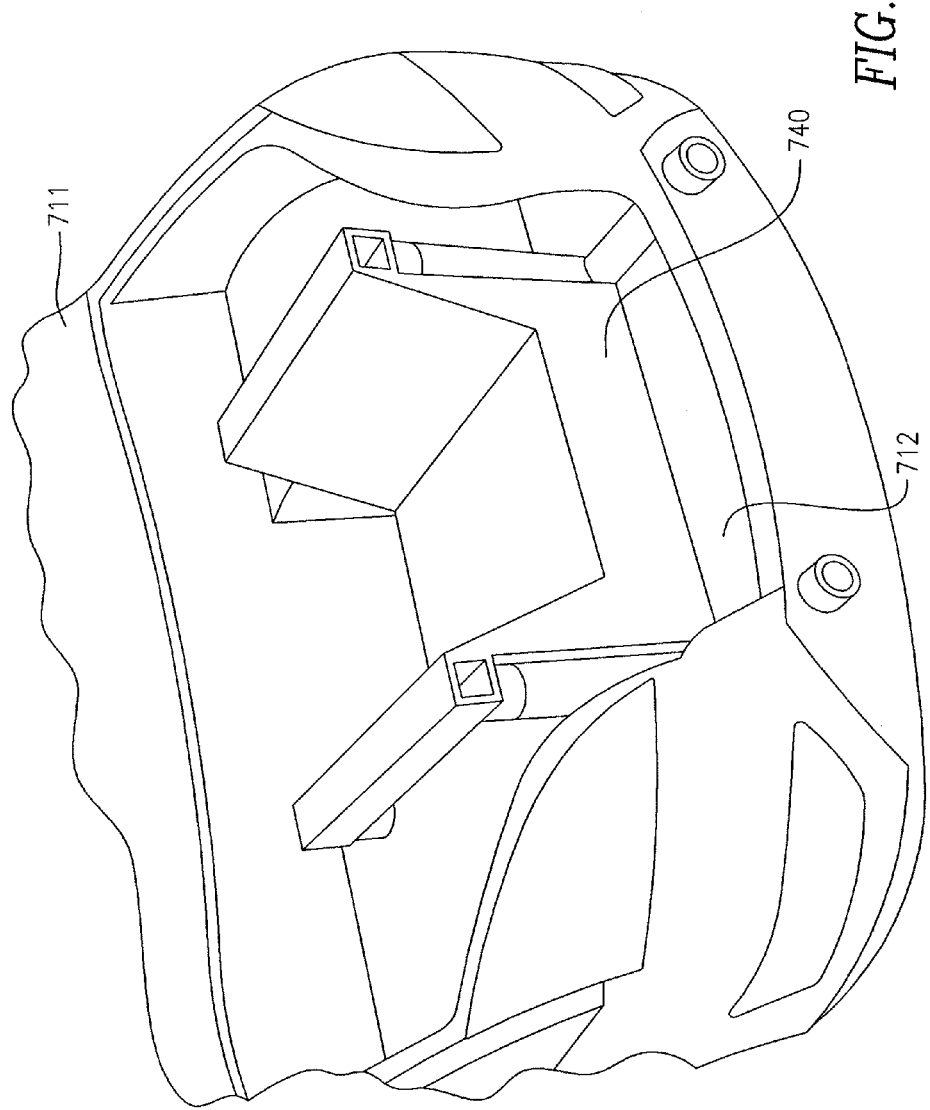
Figure 7C:
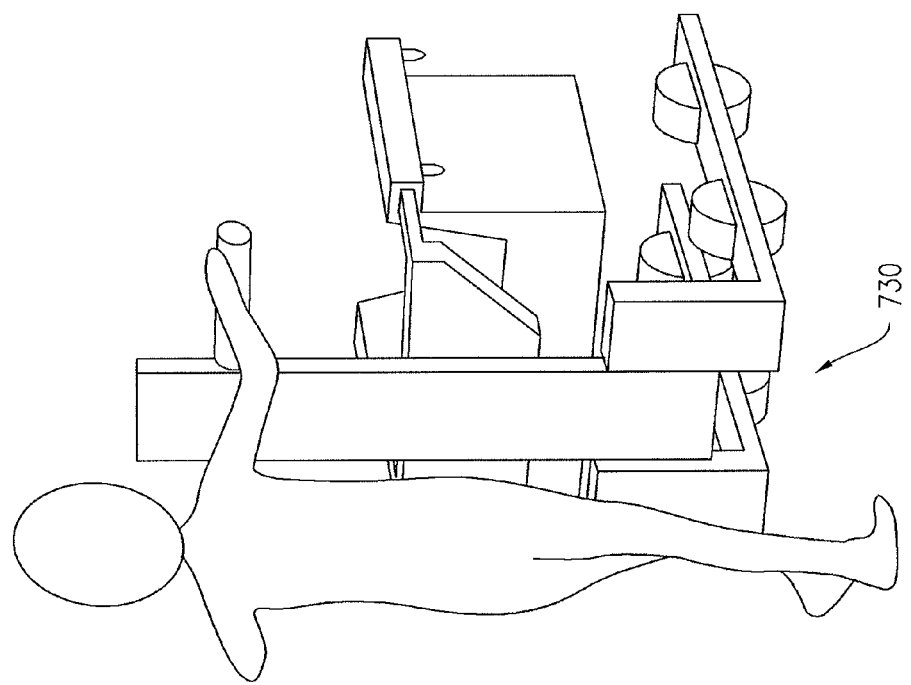
Figure 7F:
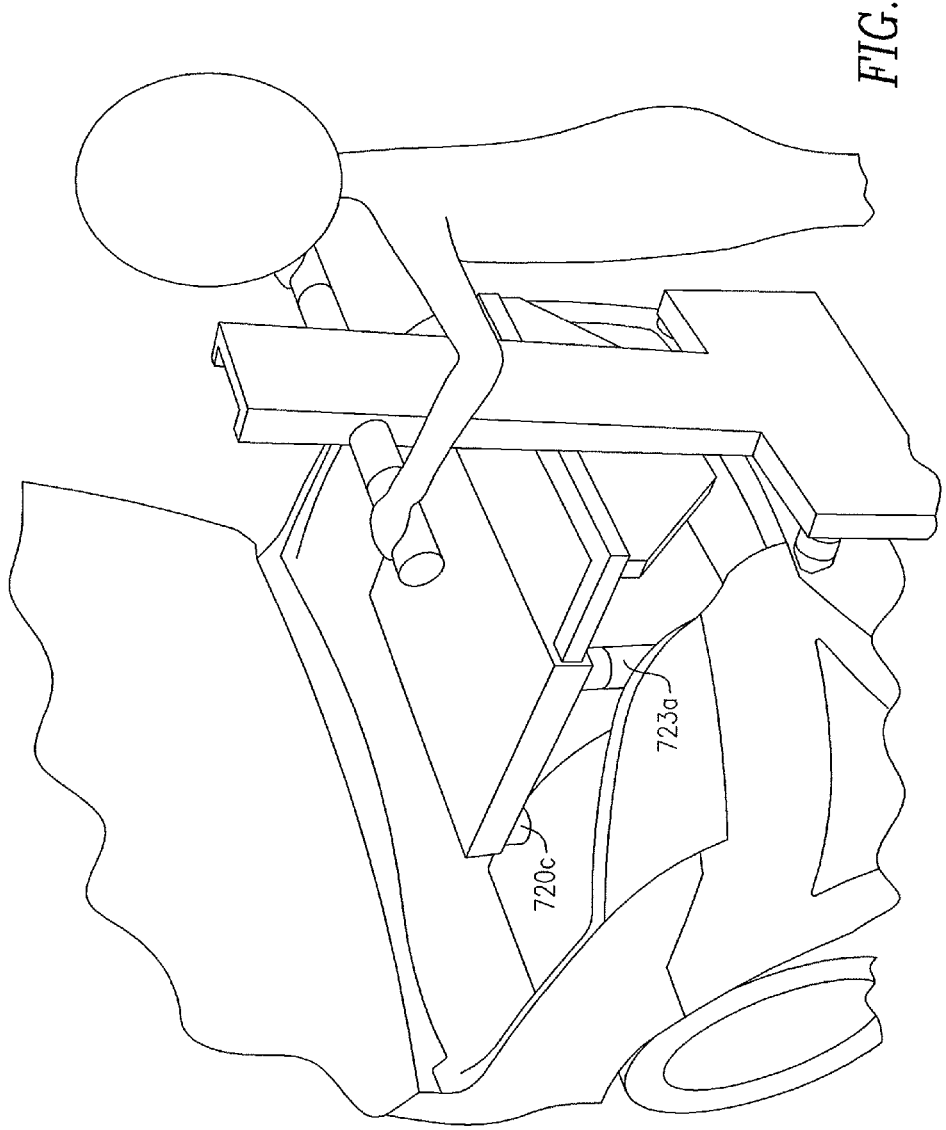
Figure 7G:
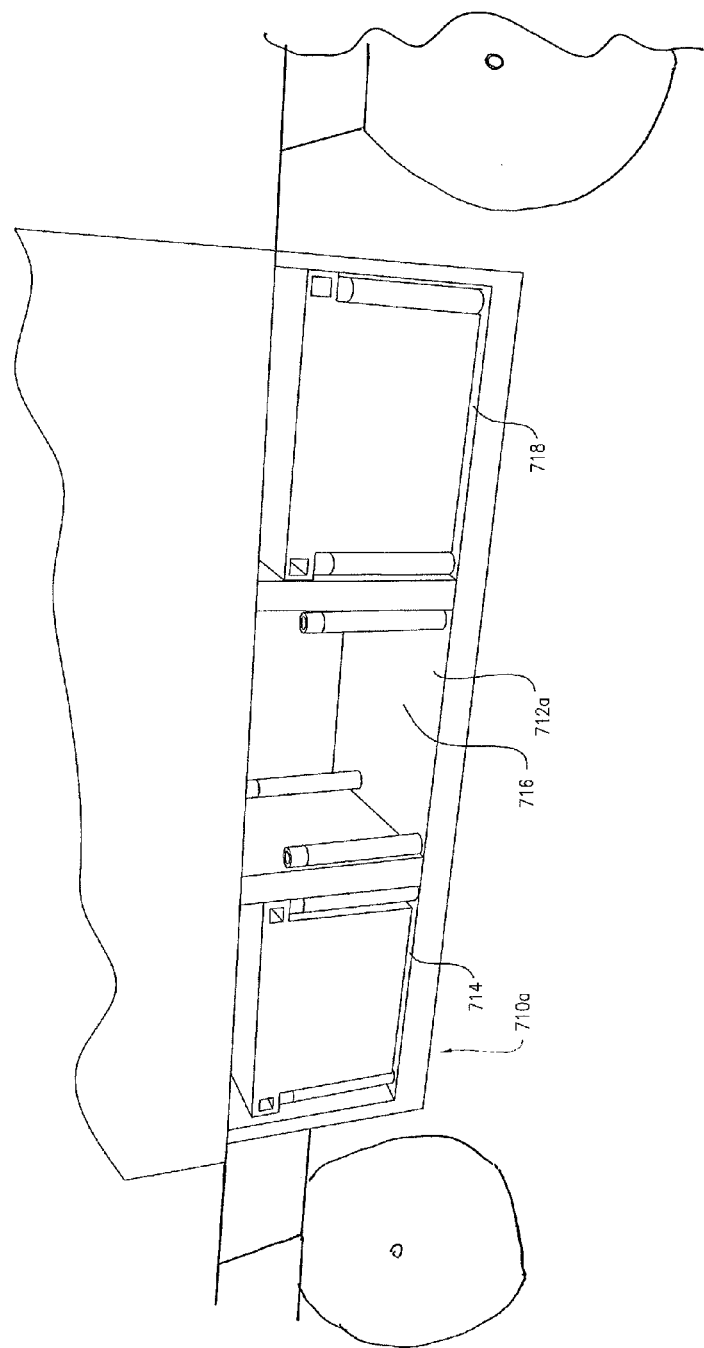

FIG. 7b shows the hood 711 of the vehicle 10 lifted with the spent battery 740 resting within a vehicle battery compartment 712. The spent battery 740 is lifted out using the forklift 730, as shown in FIG. 7c, heading toward the charging bays. This leaves the battery compartment 712 (FIG. 7d) empty, exposing the battery supports 720a, 720b, 720c, 720d. Two of these supports have electrical contacts within and the other two are configured exclusively, as mechanical supports. Subsequently, a charged, larger-sized battery 744 is lifted from the charging bay (FIG. 7e) and ferried to the vehicle and thereafter, installed in the battery compartment of the vehicle as shown in FIG. 7f. Note that a charging station attendant is performing this task without hardly any physical effort at all. This task can also be performed at home, when the appropriate arrangements are provided in homes.

A vehicle much larger than the vehicle 10, for example, a trailer-truck 710a (FIG. 7g) has a battery compartment 712a with three individual battery sections 714, 716, 718, each one constructed as previously described and housing one battery, providing the truck with much greater electrical power storage.

Figure 1:
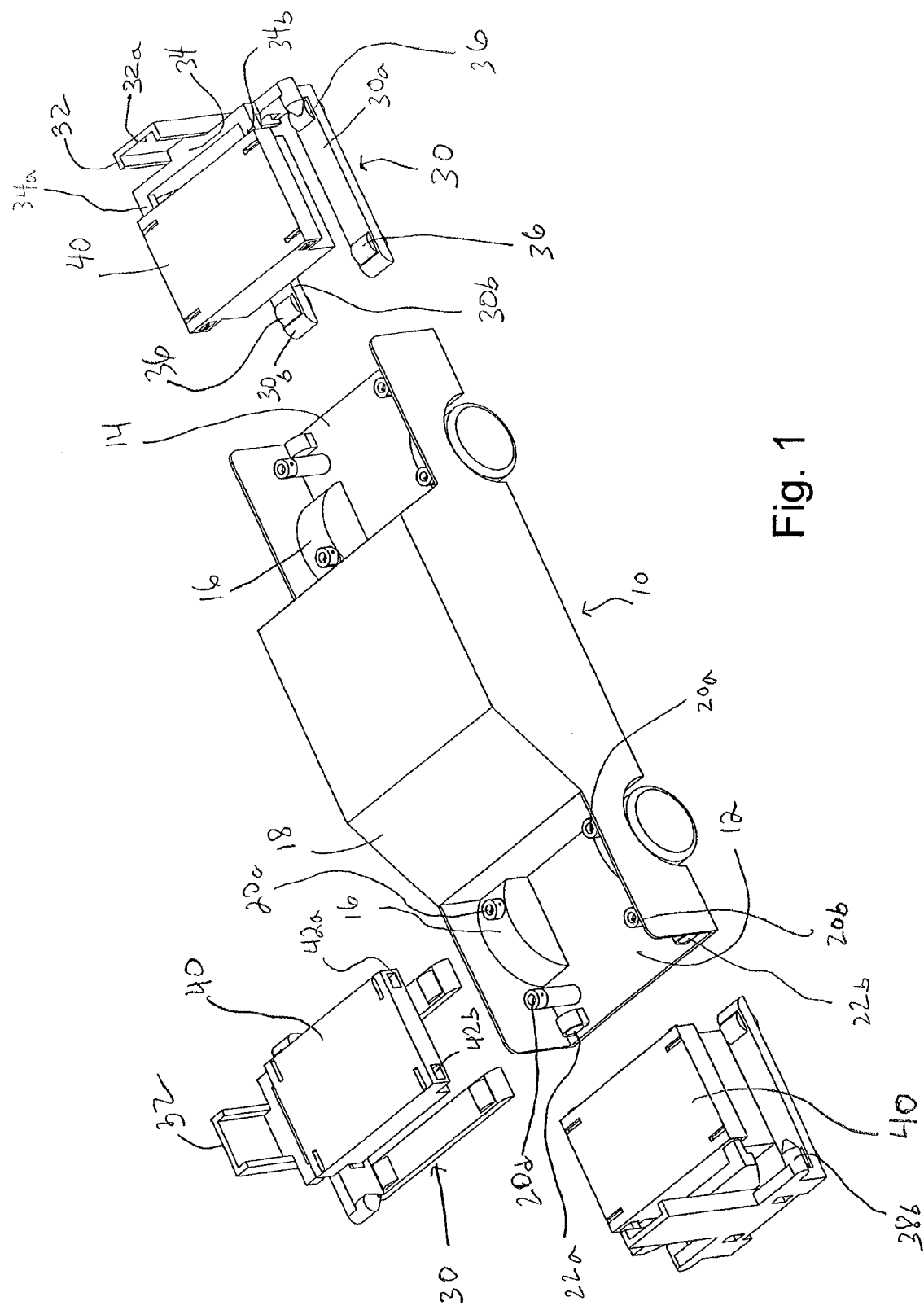
FIG. 1 is a diagrammatic illustration that shows both the standard sized batteries, the vehicle with the standardized battery receiving structure, and the battery cart or lift used for ferrying the batteries to the vehicle and installing/removing them.

Referring to FIG. 1, the electrical vehicle 10, which has a front windshield 18, preferably comprises in-wheel driven motors (not shown), that provide ample available space in the vehicle front compartment 12 (normally thought of as the engine compartment), or in the luggage compartment 14. The space that is taken up by the wheel wells protector 16 leaves plenty of room for installing in either compartment 12 or 14, four column supports 20a, 20b, 20c and 20d, which serve as both the battery supporting elements, as well as the battery electrical contacts or electrodes which deliver electrical power to the various in-wheel electrical motors of the wheels via a known motor electrical power control system (not shown). The battery ferrying vehicle which can be the forklift 30 comprises a pair of spaced rolling legs 30a and 30b, each of which supports a pair of casters 36.

The forklift or cart or trolley 30 which can be a hydraulic, manual or electric lift cart, has a rear upright member or spine 32 with a channel 32a for movably supporting the vertically movable backbone 34 which has two lifting arms 34a and 34b protruding horizontally therefrom.

Figure 3A:
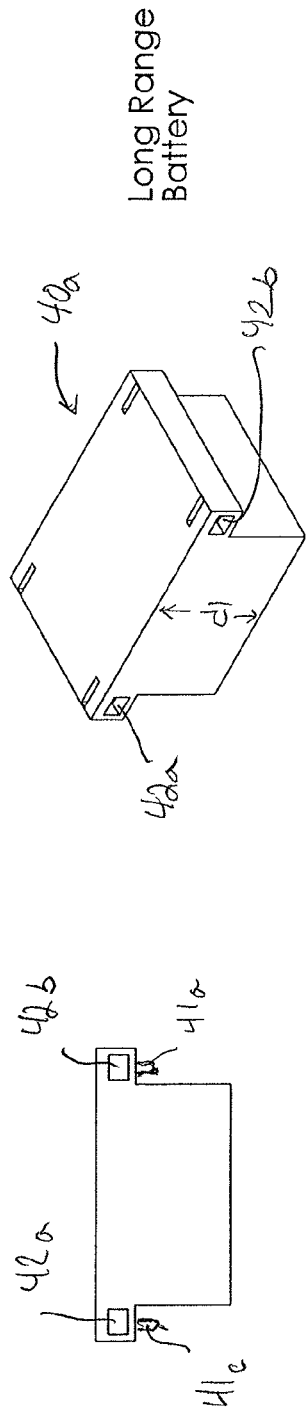
FIGS. 3a, 3b and 3c show the standard-shaped battery in different sizes.
Figure 3B:
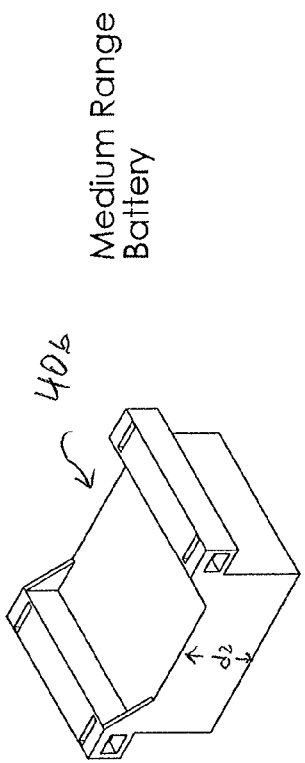
Figure 3C:
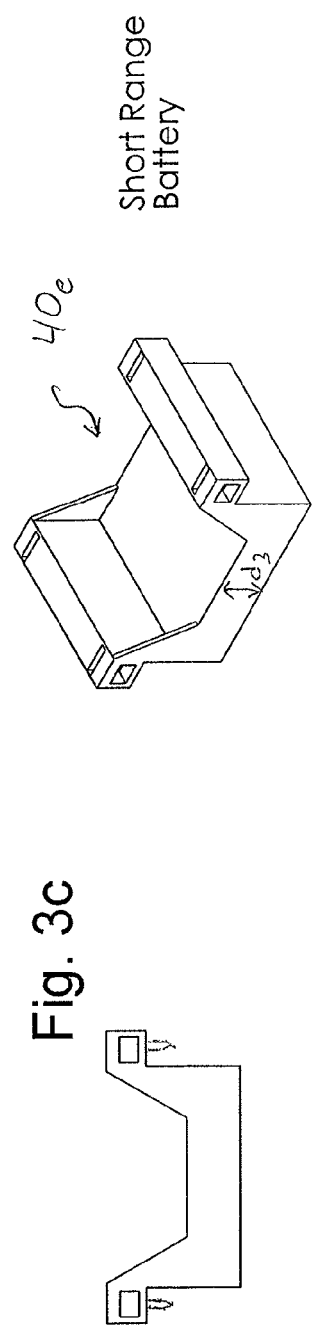

The standardized battery 40, which has the same outer shape and overall construction, but is made available at different battery sizes, can be seen in FIG. 3, which shows it in a large (long range) version (FIG. 40a), medium range version (FIG. 40b), and small (short range) version (FIG. 40c), having respective vertical sizes $d_1$, $d_2$ and $d_3$. The forklift arms pass through holding channels 42a, 42b in the battery 40 which allow the forklift to raise and lower the battery 40 so that its supports/electrical electrodes 41a, 41b, 41c, 41d fit inside the receiving cavities 23a, 23b, 23c and 23d, located either in the front compartment 12 or in the rear compartment 14 (or possibly both) to provide electrical power to the vehicle.

Figure 1A:
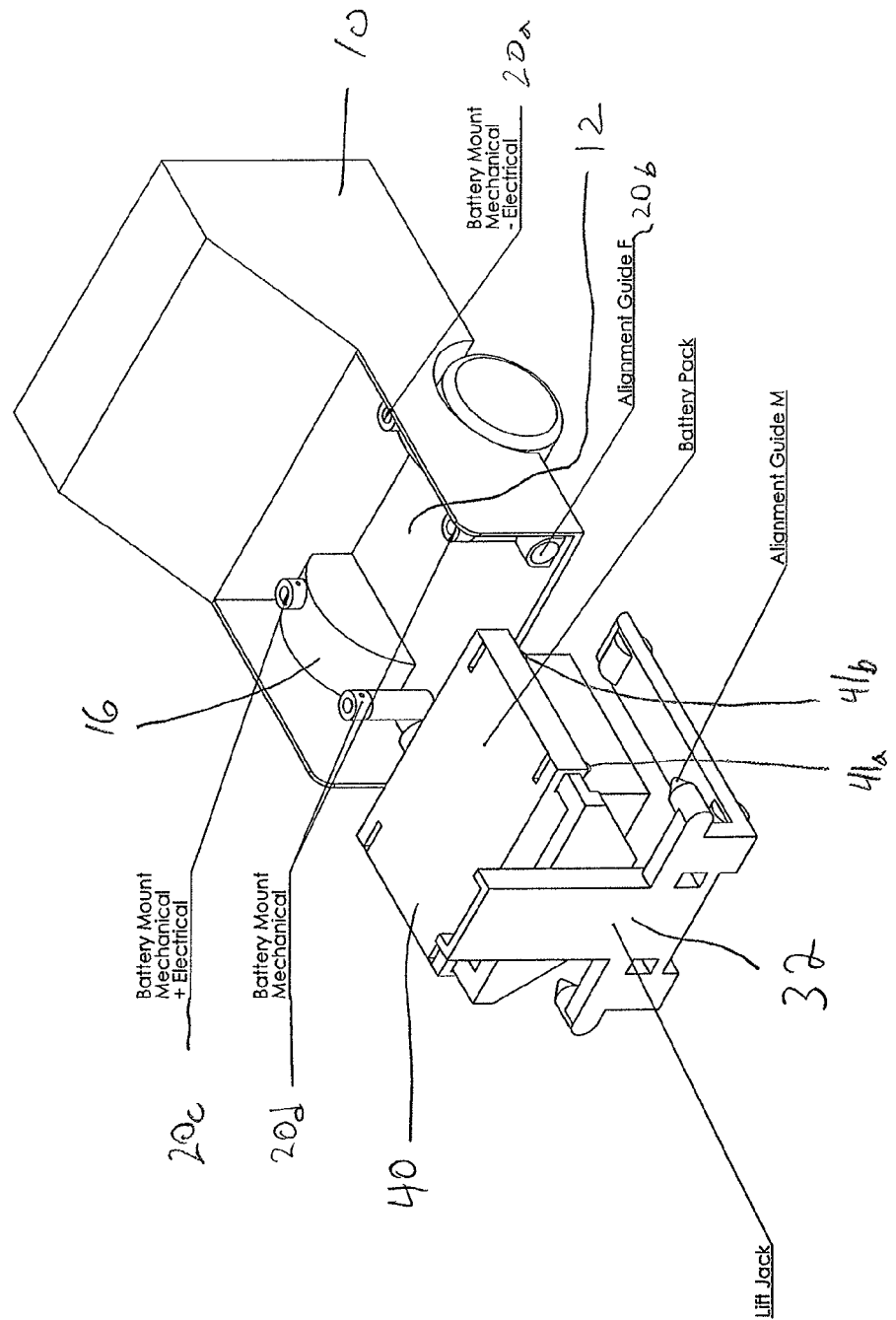
FIG. 1a shows a section of FIG. 1, enlarged to show additional details.

As shown in FIG. 1a, the supports and electrodes 20a and 20c provide both mechanical support and electrical connections, while the rear supports 20b and 20d provide only mechanical holding for the battery 40.

Further in reference to FIG. 1a, when the cart 30 is advanced toward the vehicle, its slidable guides 30a and 30b travel underneath the vehicle and the cart 30 is aligned so that the alignment protrusions 38a, 38b fit inside to the female alignment guides 22a and 22b of the vehicle, placing the battery right above the supports and allowing it to be lowered thereonto. Once the pressure is relieved inside the guides 42a, 42b, the electrical elements fit and lock inside the supports, both mechanically and electrically.

Figure 4:
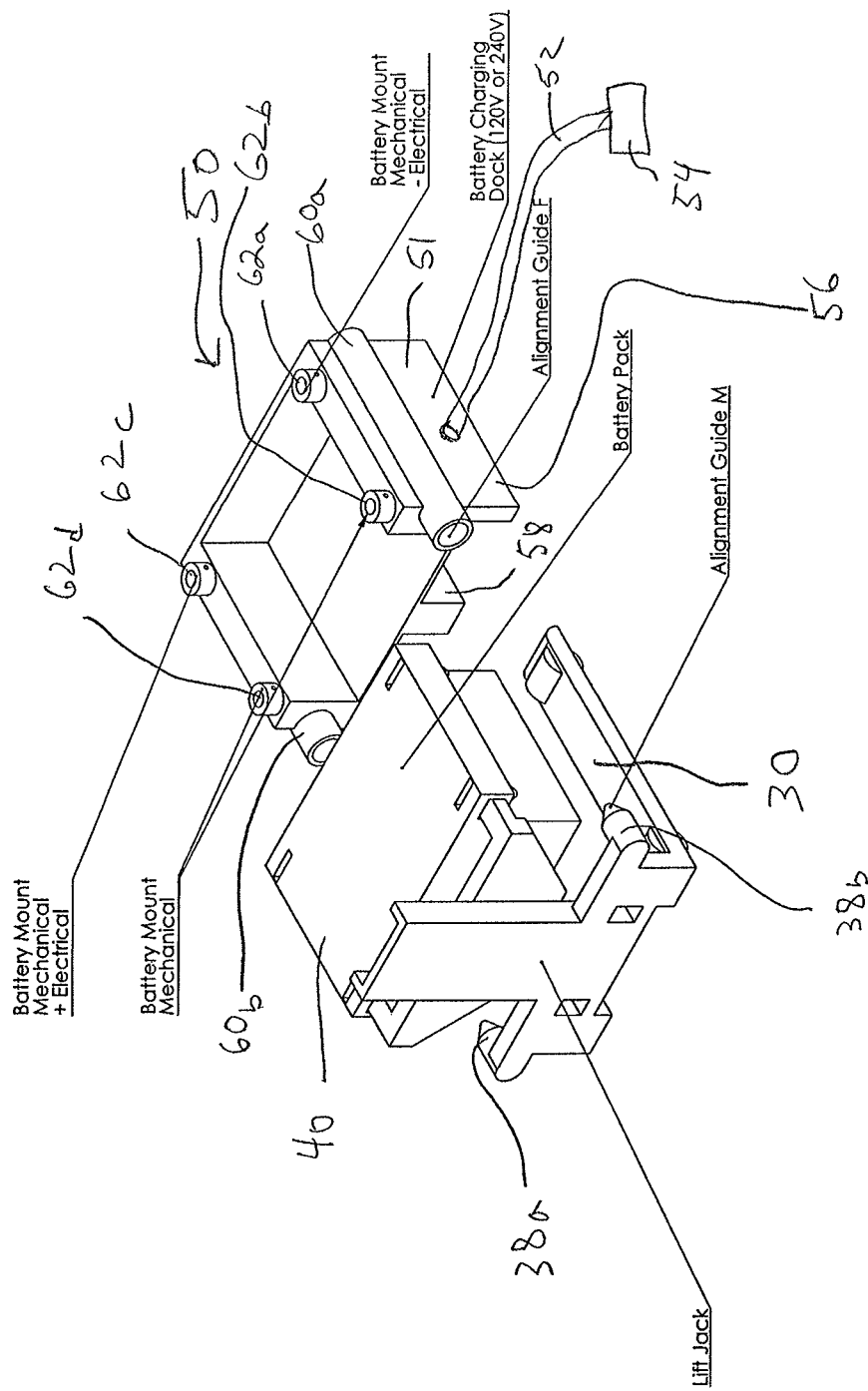
FIG. 4 shows a charging station for the battery.

FIG. 4 illustrates a battery charging dock 50 which is located at a gas station or at home and has a battery charging block 51, which is connected by a cable 52 and a connector 54 to a source of electrical power which can be 120 volts or 240 volts. The battery charging block 51 delivers power through electrical connectors located between the battery mount mechanical and electrical uprights 62a and 62c. Similar uprights (previously described) 62b and 62d provide mechanical support. In other words, the manner of transporting the battery 40 to the dock is exactly as previously described with respect the battery cradle within the vehicle.

Figure 5C:
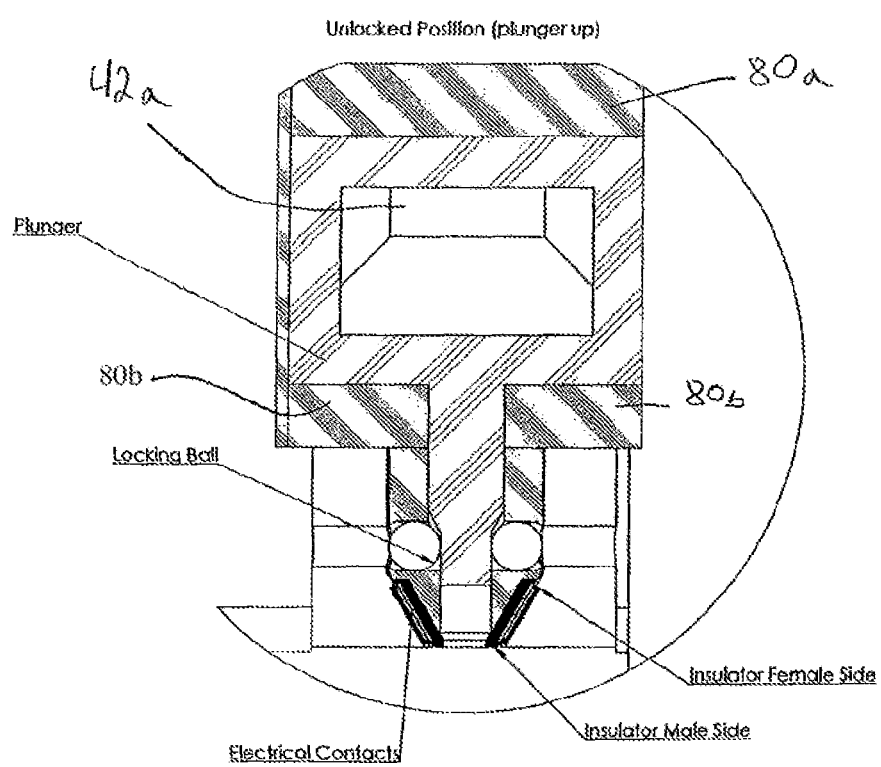

Reference is now made to FIGS. 5a through 5c. The manner in which the electrodes of the battery 40 are electrically and mechanically connected to an internal structure within the uprights 20a and 20c is now explained. In FIG. 5a, the battery, still being held against gravity by the cart 30 is lowered onto the stands 20a-20d, and the mechanical/electrical connection is made, as shown for the electrode that is circled in FIG. 5a and shown in enlarged format in FIG. 5b. FIG. 5b shows the electrical/mechanical connection after it has been completed. FIG. 5c shows the initial unlocked position. In FIG. 5b, the structure 41c in FIG. 5a is an electrical and mechanical housing 83 which houses within its interior spaces 80a, 80b a plunger 82 which has the opening for the forklift arm 42a. The plunger 82 slides vertically up and down within the spaces 80a, 80b. It is shown in the "UP" position in FIG. 5c and in the "DOWN" position in FIG. 5b. When the battery is lifted, plunger 82 inherently slides up. However, when the cart 30 allows the battery 42 move down through the force of gravity, its distal extension 84 slides vertically down, pushing the balls 74a and 74b laterally apart and in a manner which causes them to protrude into the channel 72 which is inside the supports which are part of the vehicle or the home battery dock. In this position, the battery is locked in place and will not vibrate or be released during normal driving conditions. Also, good electrical contact is established between the electrically conductive plunger 84 and the electrical contacts 70a, 70b. Male side and female side insulators are provided around the electrical contacts 70b and 70a. When the forklift arms are inserted into the channels 42a, and the battery is lifted, the plunger 84 rises and the locking balls are naturally forced by spring action to move back in and the battery can be raised.

Figure 6B:
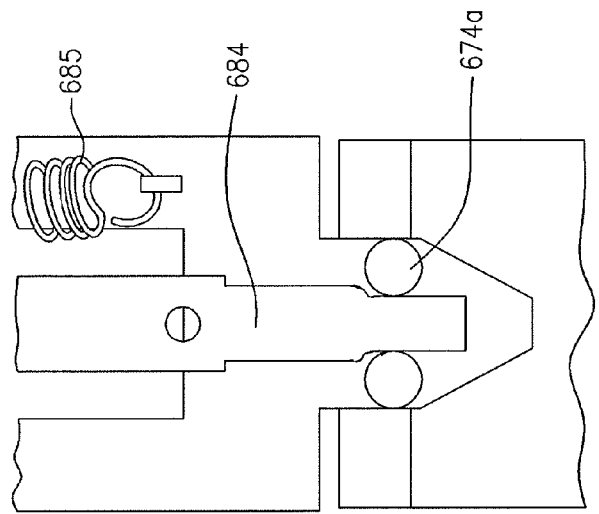
FIGS. 6a through 6c show the battery supports/electrical contacts and their modes of operation.
Figure 6A:
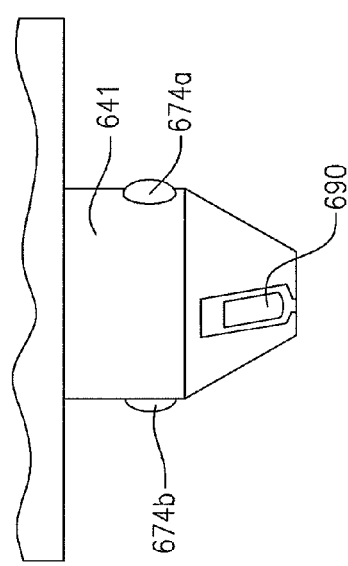
Figure 6C:
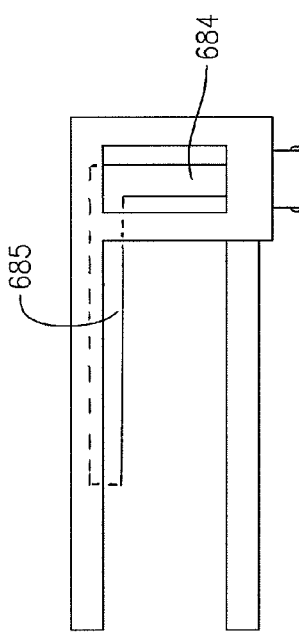
Figure 7H:
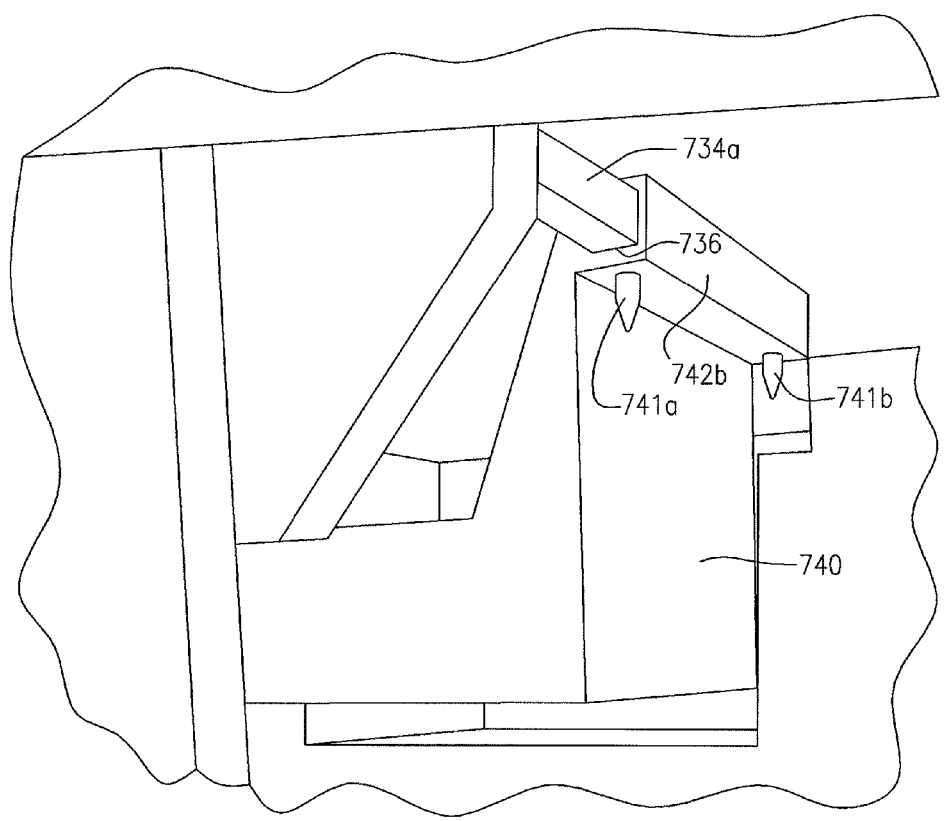
FIG. 7h is an additional diagram of the replaceable battery of the present invention.
Figure 7I:
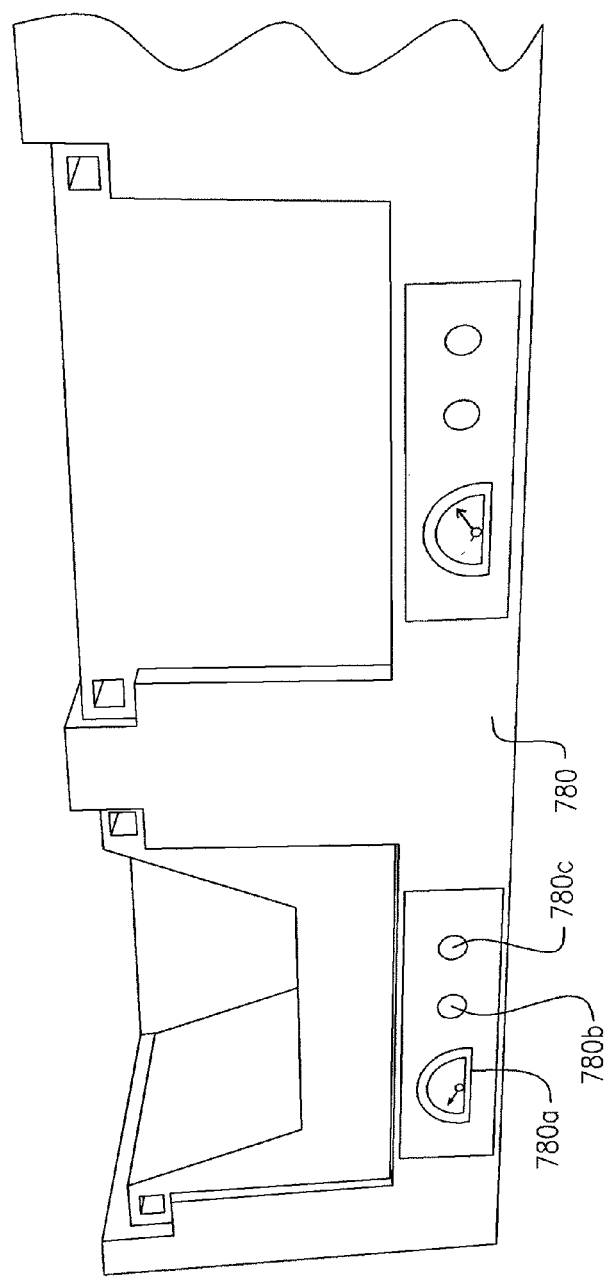
FIG. 7i shows details of the charging bay for the batteries of the present invention.

Referring to FIG. 7h, the battery 740 has the side flange 742 in which a sliding channel 736 is defined into which the forklift arms 734a, 734b can be slid to hold and lift or lower the battery in vertical directions. Most notable are the mechanical/electrical couplings and electrical contacts 741a, 741b. Referring now to FIGS. 6a through 6c, these electrodes/supports 641, have, as previously described with reference to FIG. 5b, locking balls 674a, 674b and electrical contacts 690 (FIG. 6a). The locking balls 674a, 674b are pushed sideways when the plunger 684 is lowered, as described in relation to FIG. 5b. Indeed, plunger 684 is biased by spring 685 (which is attached at one end to the plunger) downwards into the locking mode of the locking balls 674a, 674b. However, when the arms of the forklift are inserted into the channel 42a (FIG. 5b), the plunger 684 (FIG. 6c) will be raised owing to upward pressure applied on the right angle extension 685 of the plunger 684, lifting the plunger and allowing the locking balls 74a, 74b to unlock and so raise the battery off of the supports as shown, for example, in FIG. 7d and elsewhere.

As described above, the invention is directed to a system that expedites and makes it much easier to replace batteries for electrically powered vehicles, including automobiles, or even truck carts, or the like. The vehicles are outfitted with a cradle that becomes part of the vehicle chassis, and which can be located in what is today the luggage compartment or the engine compartment of the vehicle. The uprights within the battery holding compartment or cradle has four tapered holes with a slot inside to hold balls from a male electrode which are on the battery.

Lifting the package by the hydraulic/manual/electric lift cart, the two lifting arms will be directed to the right position by the two guiding pins from the cart which are under the insulation material. When lifting, the spring loaded four locking pins inside the male taper will be released, bringing the package to the car.

The invention brings to the art the concepts of:
1. Easy and inexpensive to use system.
2. Module battery size use which is economical and environmentally friendly and easily adaptable to all automobiles.
3. The system can be placed in front or in the back or on the side of cars. For trucks in particular, there can be multiple battery packages for long drives and heavy loads.
4. The locking of the battery, both mechanically and electrically, is exceedingly simple and automatic.
5. The way the battery package sits with all of its weight on the +/−terminals and the positive locking of its terminals, ensures good electrical contact from the battery to the car system.

It is implicit in the description, that the vehicle will have the necessary electrical system to interact with the battery, including all necessary gadgets and instruments. The system can be used at gas stations or at home.

By the present invention, the battery outer shape and mode of loading it into the vehicle becomes, like containers in the shipping industry, standardized. The same battery will be used with cars, trucks, golf carts, small boats, etc. The invention disposes of the need in the present vehicles of each battery system to be tailor made for a particular vehicle. The battery pack can be considered as "fuel/gas" in conventional internal combustion automobiles, and sold as such. Also, as is apparent from the foregoing; no tools or hardware such as bolts are used or required to be tightened in the battery installation or removal, not at home and not at the gas station.

As described above, the presently described new order battery exchanging system provides features and benefits, including as follows:
1. Manual self-changing by the driver or gas station attendant.
2. EVERY Gas Station can be equipped and running within few hours and with less than $30K cost.
3. It's 'Idiot Proof' loading-unloading with 'No Tool' automatic locking/unlocking of the battery Pack.
4. Time to change is same or less then filling gas, any area in the station can be used.
5. Having 'Battery Containers' which will be well built to withstand Crash and fire-will allow different batteries according to driving pattern and can be change from Short to Long Drive (Keeping SAME weight) as well to be Upgraded/Recycled with the lower cost of the charging cycle.

6. Like Better Place the battery will be leased to the driver as using gas and will be taken OFF the OEM Car cost, care/service.

7. The LOW cost of equipping gas station will make it more widespread and will increase the use and trust in the Electric cars.

8. The system can be easily implemented to Big Cities which benefit from clean air/quite environment.

9. Identical containers can be used by any car/truck/bus/boat.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electrical vehicle, comprising:
  a vehicle body defining a passenger cabin;
  at least one battery compartment with an openable hood that can be opened to expose and provide access to the battery compartment;
  a battery including electrical electrodes removably stored in the battery compartment;
  at least three battery supports mounted substantially in a vertical orientation in the battery compartment, wherein at least two of the battery supports include electrical contacts that are configured to be electrically coupled with the electrical electrodes of the battery;
  said battery including at least three downwardly depending projections which are spatially spaced and arranged relative to each other so that their spacing identically matches a corresponding spacing between said at least three battery supports in the battery compartment,
  wherein at least two of the three battery projections comprise said electrical electrodes configured to electrically mate with the electrical contacts of the battery compartment; and
  wherein the battery supports and the battery projections are so spaced and configured as to enable the battery to be vertically lowered down onto the battery supports to effect electrical contact and mechanical coupling between said battery supports and said battery projections.

2. The electrical vehicle of claim 1, wherein said battery has a left side channel and a right side channel that are configured to enable lifting the battery with a cart that has a pair of arms that are vertically movable up/down and are separated from each other so that they can be directly inserted into the left side channel to lift and ferry said battery.

3. The electrical vehicle of claim 2, wherein the left side channel and the right side channel are formed within left side and right side projecting flanges in the battery, said channel extending along a right side and along a left side of the battery, respectively.

4. The electrical vehicle of claim 2, wherein said channels have an internal cross-section that is four-sided.

5. The electrical vehicle of claim 2, wherein said channels extend perpendicularly to a height direction of the battery, which height direction is aligned with the vertical movabilty of the battery by the cart.

6. The electrical vehicle of claim 2, wherein the vehicle has a vehicle bottom located above the ground on which the vehicle is drivable, and said cart has a base portion with wheels and the base portion of the cart has a low height so that the base portion can be driven to be located under the vehicle bottom.

7. The electrical vehicle of claim 6, wherein the cart includes alignment protrusions configured to fit inside female alignment guides of the vehicle.

8. The electrical vehicle of claim 2, in combination with a battery of charging system, comprising at least one battery charging rack for holding a plurality of batteries at a plurality of locations, each battery location of the charging rack comprising electrical contacts for engaging said electrodes of said battery and providing electrical charging current thereto.

9. The electrical vehicle of claim 1, wherein said at least three battery supports comprise four column-shaped supports having upper openings for receiving thereinto the battery projections.

10. The electrical vehicle of claim 1, further including a mechanical locking mechanism between at least one of the battery projections and at least one of the battery supports.

11. The electrical vehicle of claim 10, wherein the locking mechanism comprises laterally movable locking balls movable literally by a plunger.

12. The electrical vehicle of claim 1, wherein the supports have circular cross-sections.

13. The electrical vehicle of claim 1, wherein the battery compartment is located forward of the passenger cabin, in a driving direction of the vehicle.

14. A battery exchanging system, comprising:
  a battery charging system with racks for holding a plurality of batteries at a plurality of locations, each battery location on the charging rack comprising electrical contacts for engaging electrical contacts of the batteries and charging said batteries;
  a movable cart that is configured to be movable by a single person and which includes at least one arm for engaging a battery located on the rack, for lifting the battery off the rack, and ferrying the battery to a vehicle requiring a battery to be installed thereinto; and
  a vehicle, said vehicle being an
  electrical vehicle and comprising:
  a vehicle body defining a passenger cabin;
  at least one battery compartment with an openable hood that can be opened to expose the battery compartment;
  a battery including electrical electrodes removably stored in the battery compartment;
  at least three battery supports mounted substantially in a vertical orientation in the battery compartment, wherein at least two of the battery supports include electrical contacts that are configured to be electrically coupled with the electrical electrodes of the battery;
  said battery including at least three downwardly depending projections which are spatially spaced and arranged relative to each other so that their spacing identically matches a corresponding spacing between said at least three battery supports in the battery compartment,
  wherein at least two of the three battery projections comprise said electrical electrodes configured to electrically mate with the electrical contacts of the battery compartment; and
  wherein the battery supports and the battery projections are so spaced and configured as to enable the battery to be vertically lowered down onto the battery supports to effect electrical contact and mechanical coupling between said battery supports and said battery projections.

15. The battery exchanging system of claim 14, wherein said battery has a left side channel and a right side channel that are configured to enable lifting the battery with the said cart that has a pair of arms that are vertically movable up/down and are separated from each other so that they can be directly inserted into the left side channel to lift and ferry said battery.

16. The battery exchanging system of claim 15, wherein the left side channel and the right side channel are formed within left side and right side projecting flanges in the battery, said channel extending along a right side and along a left side of the battery, respectively.

17. The battery exchanging system of claim 14, wherein said at least three battery supports comprise four column-shaped supports having upper openings for receiving thereinto the battery projections.

18. The battery exchanging system of claim 14, further including a mechanical locking mechanism between at least one of the battery projections and at least one of the battery supports.

\* \* \* \* \*